United States Patent [19]

Spencer et al.

[11] Patent Number: 5,036,448
[45] Date of Patent: Jul. 30, 1991

[54] DC TO AC INVERTER AND METHOD FOR PRODUCING THREE PHASES FROM TWO INPUT PHASES

[75] Inventors: William M. Spencer; Joseph S. Breit, both of Rockford, Ill.

[73] Assignee: Sundstrand Corporation, Rockford, Ill.

[21] Appl. No.: 452,425

[22] Filed: Dec. 19, 1989

[51] Int. Cl.⁵ .............................................. H02M 5/06
[52] U.S. Cl. ........................................ 363/2; 363/154
[58] Field of Search ............... 363/2, 5, 17, 98, 132, 363/149, 154, 4

[56] References Cited

U.S. PATENT DOCUMENTS

| | | | |
|---|---|---|---|
| 3,278,825 | 10/1966 | Haas, Jr. ............................ | 363/2 |
| 3,295,044 | 12/1966 | Pledger et al. ..................... | 363/2 |
| 3,354,376 | 11/1967 | Corey et al. ...................... | 363/2 |
| 4,106,089 | 8/1978 | Fettinger .......................... | 363/153 |
| 4,249,235 | 2/1981 | Immler ............................. | 363/2 |
| 4,618,809 | 10/1986 | Maeda ............................. | 363/154 |
| 4,644,241 | 2/1987 | Maeda ............................. | 363/154 |

Primary Examiner—Steven L. Stephan
Assistant Examiner—Jeffrey Sterrett
Attorney, Agent, or Firm—Antonelli, Terry, Stout & Kraus

[57] ABSTRACT

A three phase inverter (10) in accordance with the invention includes a first phase inverter (12) producing a first phase AC output voltage from a DC power supply; a second phase inverter (14) producing a second phase AC output voltage which is displaced nominally 120° from the first phase from the DC power supply; and a vector adding circuit (32), responsive to the first and second phases, for vectorially adding voltages proportional to output voltages from the first and second phases to produce a resultant voltage which is inverted to produce a third phase having an output voltage which is displaced nominally 120° from the output voltages produced by the first and second phases.

29 Claims, 4 Drawing Sheets

1

DC TO AC INVERTER AND METHOD FOR PRODUCING THREE PHASES FROM TWO INPUT PHASES

DESCRIPTION

1. Technical Field

The present invention relates to AC power generating systems which produce three output phases from two input phases.

2. Background Art

Systems are known for producing three phase alternating current from two phases produced by inverters which vectorially add the two phases to produce the third phase. U.S. Pat. Nos. 3,278,825 and 3,354,376 disclose three phase AC power generating systems which utilize two inverters which produce phase outputs 90° apart which are vectorially added by a Scott-T connection to produce the three output phases. U.S. Pat. No. 4,106,089 discloses an AC power generating system which produces a three phase output having low fifth and seventh harmonics by vectorially adding three phase outputs produced respectively by first and second three phase inverters which are phase displaced a total of 30° apart.

3. Disclosure of Invention

The present invention provides a three phase AC power generating system useful for generating power in an airframe which is light in weight and has a minimum number of switches. With the invention, two inverters respectively produce AC output phases displaced 120° apart which are processed by a vector adding circuit which vectorially adds voltages proportional to output voltages from the first and second phases to produce a resultant voltage which is inverted to produce a third phase which is displaced 120° from the first and second phases.

With the invention, a three phase output is produced with four switches and a vector adding transformer. As a result, two switches are saved from a conventional six switch three phase inverter topology. Furthermore, the vector adding transformer eliminates the requirement for a filter in the third phase output when the inputs from the first and second phases to the vector adding transformer are filtered. The invention may also be utilized for a motor control.

A three phase power generating system in accordance with the invention includes a first phase inverter producing a first phase AC output voltage from a DC potential; a second phase inverter producing a second phase AC output voltage which is displaced 120° from the first phase from the DC potential; and a vector adding circuit, responsive to the first and second phases, for vectorially adding voltages proportional to output voltages from the first and second phases to produce a resultant voltage which is inverted to produce a third phase having an output voltage which is displaced nominally 120° from the output voltages produced by the first and second phases, the vector adding circuit comprises a transformer having a primary winding with a neutral coupled to a tap of the primary winding, a first terminal of an end of the primary winding coupled to the first phase inverter and a second terminal of an end of the primary winding coupled to the second phase inverter and the third output phase being produced by the secondary. The vector adding circuit comprises a transformer having a primary winding having first and second terminals electrically coupled to opposite ends of the primary winding and a tap electrically coupled to the primary winding between the terminals and a secondary winding producing an inversion of a function of the sum of the output voltages of the first and second inverters as the third phase and having first and second terminals electrically coupled to opposite ends of the second winding, the AC output voltage of the first phase inverter being coupled to the first terminal of the primary winding and a phase output of the first phase being from the first terminal and a neutral, the AC output voltage of the second phase inverter being coupled to the second terminal of the primary winding and a phase output of the second phase being from the second terminal and the neutral, and a phase output of the third phase being from the first and second terminals of the secondary winding. Each inverter may include a filter coupled to a switching circuit of the inverter and a terminal of the primary winding. Each inverter includes a pair of switches, coupled to a DC potential of a DC power source and one of the terminals of the primary winding, which are switched between on and off states to produce the AC output voltage in response to control signals applied from a controller. The controller averages the AC output voltage of each of the three phases, compares the average to a reference voltage which is proportional to a desired regulated output voltage to produce an error signal, and controls switching of the switches as a function of the error signal to cause the phases to produce the regulated voltage. The controller pulse width modulates the on state of the switches of at least one of the first and second phases as a function of the error voltage to vary a magnitude of the output voltage of the third phase. Alternatively, the controller pulse width modulates the on state of the switches of at least one of the first and second phases as a function of the error voltage to vary a phase of the output voltage of at least one of the first and second phases to vary the output voltage of the third phase. A filter is coupled to a switching circuit of the inverter and a terminal of the primary winding. Alternatively, a filter is connected to each phase output.

A method of generating three phase alternating current with each phase being displaced nominally 120° from each other phase from two alternating current voltages displaced nominally 120° apart with each alternating current voltage of the two alternating current voltages being produced by switching a DC potential in accordance with the invention comprises vectorially adding the two alternating current voltages together which are proportional in magnitude to first and second phase outputs to produce a resultant voltage by application of one of the alternating current voltages to a primary of a transformer between an end of a primary winding and a tap of the primary winding and by application another of the alternatign current voltages to the primary winding of the transformer between another end of the primary winding and the tap; and vectorially inverting the resultant voltage to produce a third phase output which is nominally displaced 120° from the first and second voltages by magnetic flux coupling of the primary winding to a secondary winding of the transformer to produce the third phase output from the secondary winding. The two alternating current voltages are nominally equal in magnitude. The vectorial adding and inverting is performed by a transformer. The two alternating current potentials are filtered prior to vecto-

BEST MODE FOR CARRYING OUT THE INVENTION

Figure 1:
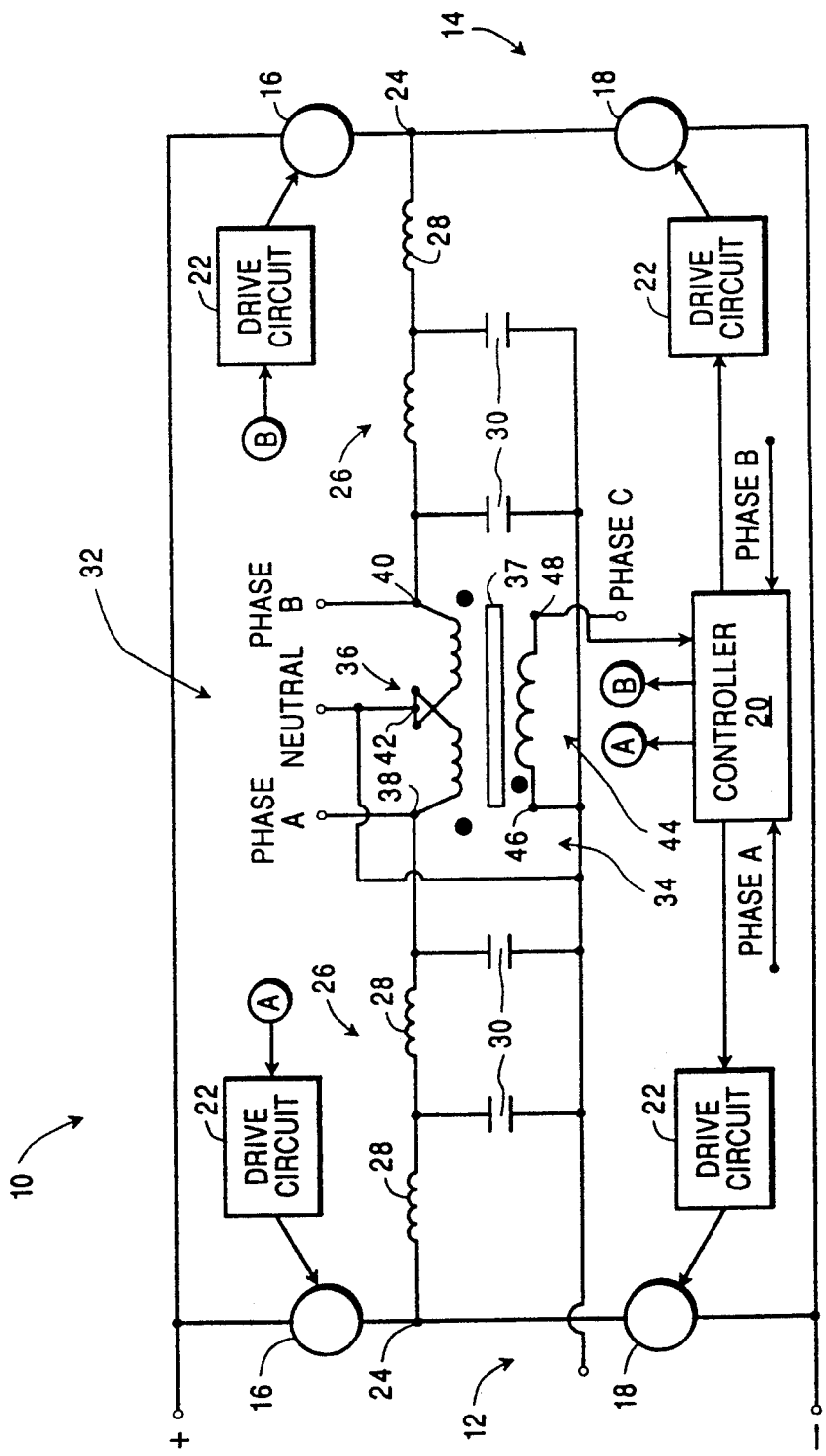
FIG. 1 illustrates a first embodiment of the present invention.

FIG. 1 illustrates a three phase power generating system 10 in accordance with the present invention. The power generating system 10 generates three phase outputs nominally displaced 120° apart from each other from two phases generated by first and second single phase inverters 12 and 14 of conventional construction. Each inverter 12 and 14 is comprised of a pair of switches 16 and 18 connected in series between first and second DC potentials which may be in an airframe application nominally +135 volts DC and −135 volts DC provided by DC rails. The switches 16 and 18 of each inverter have on and off states which are controlled by signals produced by controller 20 which are applied to drive circuits 22 which apply control signals to the control terminal of the switches. The on state of each of the switches 16 and 18 is pulse width modulated in a conventional manner to control the magnitude and/or phase of the resultant AC envelope produced by switching the switches 16 and 18 on and off to produce a fundamental frequency which is the fundamental frequency of the three phases produced by the power generating system typically 400 Hz. The single phase inverters 12 and 14 are controlled by the controller 20 to produce a fundamental AC envelope of the same frequency which are phase displaced 120° apart in a conventional manner. Regulation of the potential produced by the three phase inverter under the control of the controller 20 is described below. The junction 24 between the switches 16 and 18 is coupled to a filter 26 comprised of two LC stages each containing an inductor 28 and a capacitor 30. The function of the two-stage filter 26 is to attenuate harmonics above the fundamental frequency.

A vector adding circuit 32 functions to vectorially add voltages proportional to output voltages from phase A and phase B to produce a resultant voltage which is inverted to produce phase C which is nominally displaced 120° from the output voltages produced by phases A and B. Preferably, the vector adding circuit 32 is comprised of a vector adding transformer 34. The vector adding transformer has a primary winding 36 having first and second terminals 38 and 40 electrically coupled to opposite ends of the primary winding and a tap 42 electrically coupled to the primary winding between the terminals. The vector adding transformer 34 also has a secondary winding 44 producing an inversion of a function of a sum of the AC output voltages of the inverters 12 and 14 as phase C. The secondary winding 44 has a first terminal 46 and a second terminal 48 electrically coupled to opposite ends of the secondary winding. The AC output voltage of the first inverter 12 is coupled to the terminal 38 of the primary winding 36 and a phase output of phase A is from terminal 38 and the neutral. The AC output voltage of the inverter 14 is coupled to the terminal 40 of the primary winding and a phase output of the phase B is from the terminal 40 and the neutral. The phase output of phase C is from the terminals 46 and 48 of the secondary winding 44.

The three phase AC power generating system 10 of FIG. 1 has the advantage of eliminating a pair of switches which are conventionally found in the third phase of a three phase AC inverter and eliminates a third filter stage associated with the third phase output as a consequence of filtering of the AC output potentials produced by the inverters 12 and 14 prior to processing by the vector adding circuit 32.

Figure 2:
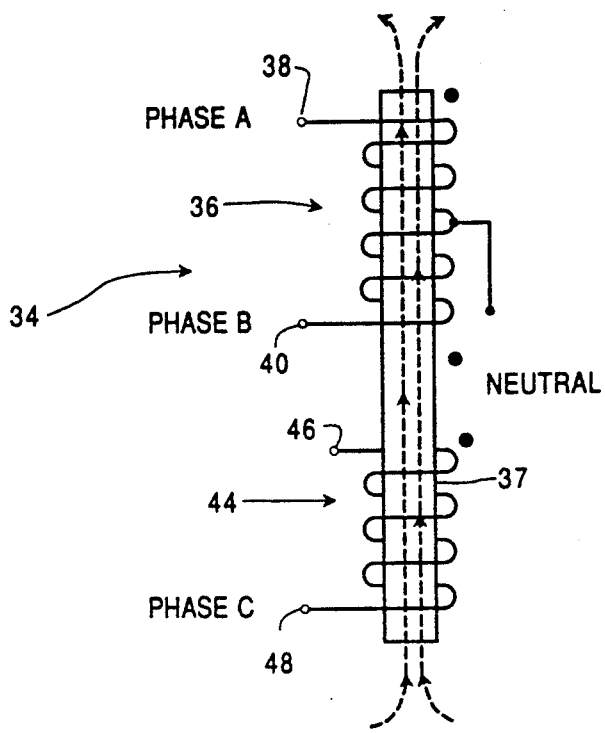
FIG. 2 illustrates the flux linkage in the vector adding transformer of FIG. 1.

FIG. 2 illustrates the flux linkage in the vector adding transformer 34 of FIG. 1. Like reference numerals identify like parts in FIGS. 1 and 2. Current flow in phases A, B and C alternates, respectively, between terminal 38 of the primary winding and the neutral, between terminal 40 and the neutral, and between terminal 46 and terminal 48 of the secondary winding. The vector addition is produced by the common magnetic flux linkage of the currents produced by the phases A and B of the primary winding with the secondary winding. Magnetic flux is indicated by dashed lines passing through core 37 of the vector adding transformer 34. The primary turns between terminal 38 and the AC neutral and between terminal 40 and the AC neutral are equal in number. The number of turns in the secondary between terminals 46 and 48 is selected so that the magnitude of phase A, phase B and phase C outputs are all equal as described below in the phasor diagrams of FIGS. 3–8.

Figure 3:
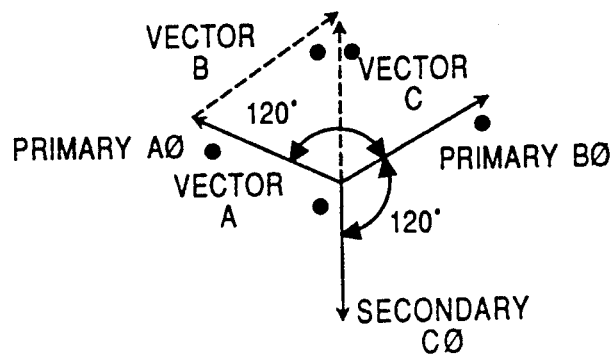
FIG. 3 illustrates a phasor diagram of the generation of the third phase from the first and second phases.

FIG. 3 illustrates a phasor diagram of the vectorial addition and inversion performed by the vector adding transformer 34. The phasor diagram illustrates the nominal 120° phase displacement relationship between phases A, B and C. As illustrated, phases A and B are vectorially added to produce a resultant voltage "vector C" identified by a dotted arrow in FIG. 3. As a consequence of the connection of terminal 46 to the DC neutral, the output phase C is inverted as indicated by the solid arrow "secondary C0".

Figure 4:
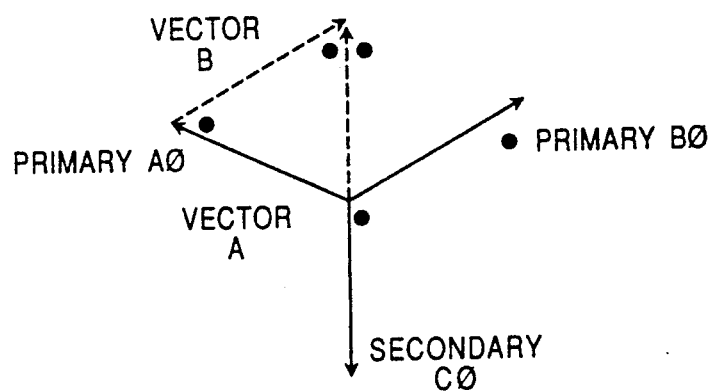
FIG. 4 illustrates the effect on the output voltage of phase C when the magnitude of the voltage of the phases A and B is increased with respect to the voltages of FIG. 3.
Figure 5:
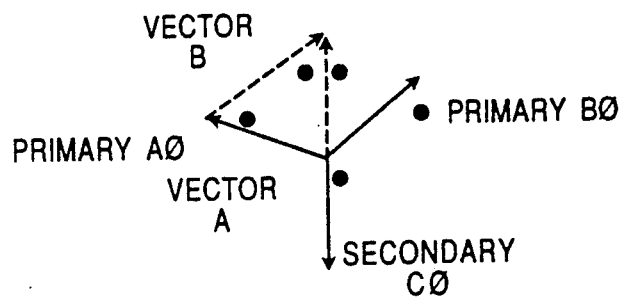
FIG. 5 illustrates the effect on the output voltage of phase C when the magnitude of the voltage of the phases A and B is reduced with respect to the voltages of FIG. 3.

The controller 20 regulates the output potential produced by the power generating system 10 by averaging each of the phase A, B and C outputs, comparing the average to a voltage which is proportional to a desired output voltage to be produced by the power generating system 10 and varying the pulse width modulation of the on cycle of the switches 16 and 18 of the inverters 12 and 14. FIG. 4 illustrates the operation of the controller 20 in increasing the magnitude of the output potential of phases A, B and C by increasing the duty cycle of the on state of the switches 16 and 18 of the inverters 12 and 14. FIG. 5 illustrates the operation of the controller 20 in decreasing the magnitude of the output potential of phases A, B and C by decreasing the duty cycle of the switches 16 and 18 of the inverters 12 and 14.

Figure 6:
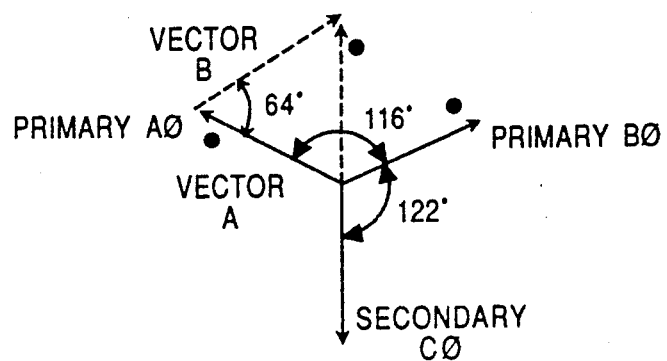
FIG. 6 illustrates the effect on the output voltage of phase C when the phase of phases A and B is varied from their nominal phase.

FIG. 6 illustrates an alternative method of voltage regulation of the phases A, B and C based upon variation of the phase relationship between the phases A, B and C. The phase angle relationship between phases A, B and C is nominally 120°. In a three phase AC power generating system of the type utilized in airframes, variation of plus or minus 4° between phases is acceptable. The vector adding transformer 34 may introduce some phase angle error. The vector adding transformer 34 should produce as small an error from the nominal phase displacement of 120° as is possible. The timing relationship of the switching of the on and off states of the switches 16 and 18 of the inverters 12 and 14 may be changed from the nominal 120°. As illustrated, if the phases A and B are displaced 116° apart, the resultant phase C produced by the vector adding transformer 34 will be 122° apart. Therefore, assuming a nominal displacement between phases A and B of 120°, reduction of the phase displacement between phases A and B may be produced by the controller 20 varying the timing of the on and off state of the switches 16 and 18 to introduce shifting of phase C for purposes of voltage regulation. Alternatively, the controller 20 may vary the phase of the duty cycle of the switches to shift the phases A and B apart to provide a phase displacement between phase B and C of less than the nominal 120° for purposes of voltage regulation.

Figure 7:
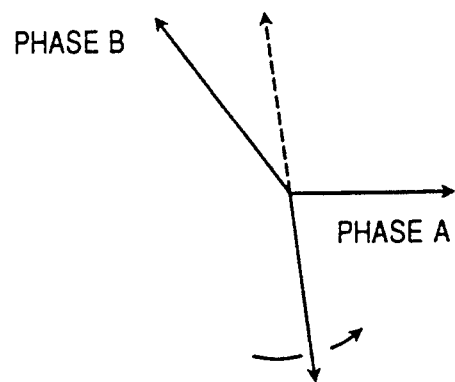
FIG. 7 illustrates the effect on the output voltage of phase C when the magnitude of phase B is increased with respect to the phase A.
Figure 8:
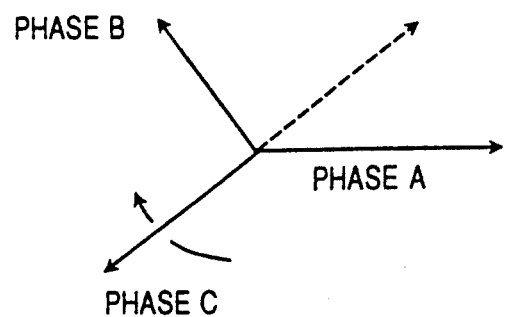
FIG. 8 illustrates the effect on the output voltage phase C when the magnitude of phase A is increased with respect to phase B.

FIG. 7 illustrates a phasor diaqram in which phase correction is produced by increasing the magnitude of phase B with respect to phase A to cause counterclockwise rotation of phase C and FIG. 8 illustrates increasing of the magnitude of phase A with respect to phase B to cause counterclockwise rotation of phase C.

The controller 20 in regulating the output voltage produced by phases A, B and C may be used in a combination of voltage and phase control techniques. As discussed above, the on duty cycle of the switches 16 and 18 of the inverters 12 and 14 may be proportionally increased or decreased to vary the magnitude of the voltage of phases A, B and C as illustrated in FIGS. 4 and 5 by comparing an average of the output voltages to a reference voltage to develop an error signal which controls the pulse width modulation of the switches in a conventional manner. Alternatively, variation of the phase displacement between the individual phases may be accomplished as a function of the aforementioned error signal as illustrated in FIG. 6. Additionally, the magnitude of the voltage of the individual phases A and B may be varied to change the relative phase displacement between the phases A, B and C as illustrated in FIGS. 7 and 8. Variation of the magnitude of the individual phases A and B may be utilized when severely unbalanced loads are being driven by the inverter 10 which makes regulation based upon the average of the output phases A, B and C impossible to bring the output voltages within the range of the target regulation voltage.

Figure 9:
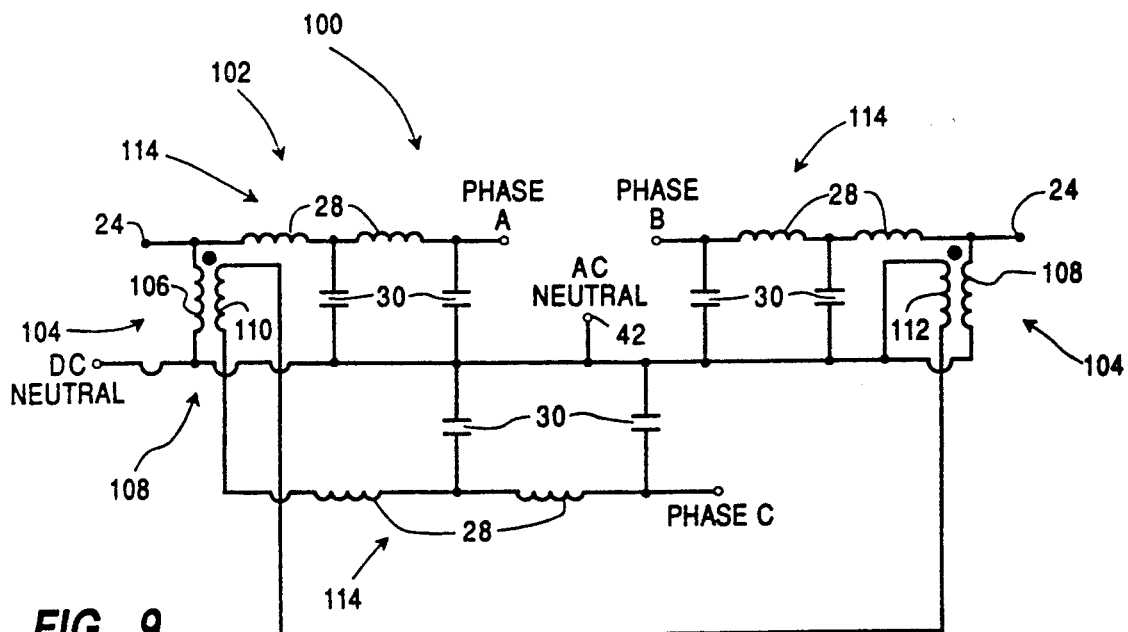
FIG. 9 illustrates an alternative embodiment of the present invention in which filtering of the output voltages produced by the phases is accomplished after vectorial adding and inverting of the first and second phases.

FIG. 9 illustrates an alternative embodiment 100 of an inverter in accordance with the present invention. The switches 16 and 18, controller 20 and drive circuits 22 have been omitted to simplify the illustration. However, these elements are utilized with the embodiment of FIG. 9. Like reference numerals identify like parts in FIGS. 1 and 9. The embodiment 100 of FIG. 9 differs from FIG. 1 in that filtering of the phases A, B and C is performed after vectorial adding and inversion. The vector adding circuit 102 utilizes a vector adding transformer 104 which performs the same vectorial adding and inversion produced by the vector adding transformer 34 of FIG. 1. However, primary winding 104 is comprised of a first part 106 disposed between the junction point 24 and the DC reference connected to the inverter 12 and a second part 108 connected to the junction point 24 of inverter 14. The secondary winding 108 is comprised of a first part 110 magnetically linked to the part 106 of the primary winding and a second part 112 magnetically linked to the second part 108 of the primary winding to perform the vectorial addition and inversion. The AC output produced by inverters 12 and 14 at junction points 24 is coupled to a two-stage LC filter 114 comprised of inductors 28 and capacitors 30 to respectively produce phase A and B outputs in which undesired harmonics have been removed. A two-stage LC filter 114 comprised of inductors 28 and capacitors 30 is coupled between the DC reference and the secondary winding 108 to filter undesired harmonics from phase C. The advantage of the embodiment of FIG. 9 over that of FIG. 1 is that the size of the vector adding transformer may be reduced as a consequence of operation at a higher frequency than in the embodiment 10 of FIG. 1 in which high frequency components have been filtered from application to the primary winding 36 prior to vector adding and inversion.

It is important to minimize losses produced by the vector adding transformer. Losses are minimized by reducing the impedance of the vector adding transformer.

While the invention has been described in terms of its preferred embodiment, numerous modifications may be made thereto without departing from the spirit and scope of the invention. For example, the present invention may be utilized for driving a motor with the transformer being incorporated directly within the motor windings. It is intended that all such modifications fall within the scope of the appended claims.

We claim:

1. A power generating system comprising:
   a first phase inverter producing a first phase AC output voltage from a DC potential;
   a second phase inverter producing a second phase AC output voltage which is displaced nominally 120° from the first phase from the DC potential;
   a vector adding circuit, responsive to the first and second phases, for vectorially adding voltages proportional to output voltages from the first and second phases to produce a resultant voltage which is inverted to produce a third phase having an output voltage which is displaced nominally 120° from the output voltages produced by the first and second phases; and wherein
   the vector adding circuit comprises a transformer having a primary winding with a neutral coupled to a tap of the primary winding, a first terminal of an end of the primary winding coupled to the first phase inverter and a second terminal of an end of the primary winding coupled to the second phase inverter and the third output phase being produced by the secondary.

2. A power generating system in accordance with claim 1 wherein:
the primary winding has first and second terminals electrically coupled to opposite ends of the primary winding and a tap electrically coupled to a midpoint of the primary winding between the terminals and a secondary winding producing an inversion of a function of a sum of the AC output voltages of the first and second inverters as the third phase and having first and second terminals electrically coupled to opposite ends of the secondary winding, the AC output voltage of the first phase inverter being coupled to the first terminal of the primary winding and a phase output of the first phase being from the first terminal and the neutral, the AC output voltage of the second phase inverter being coupled to the second terminal of the primary winding and a phase output of the second phase being from the second terminal and the neutral, and a phase output of the third phase being from the first and second terminals of the secondary winding.

3. A power generating system in accordance with claim 2 wherein each phase inverter further comprises:
a filter coupled to a switching circuit of the inverter and a terminal of the primary winding.

4. A power generating system in accordance with claim 3 wherein each phase inverter further comprises:
a pair of switches, coupled to DC potentials of a DC power source and one of the terminals of the primary winding, which are switched between on and off states to produce the AC output voltage in response to control signals applied from a controller.

5. A power generating system inverter in accordance with claim 4 wherein:
the controller averages the AC output voltage of the three phases, compares the average to a reference voltage which is proportional to a desired regulated output voltage to produce an error signal, and controls switching of the switches as a function of the error signal to cause the phases to produce the regulated output voltage.

6. A power generating system in accordance with claim 5 wherein:
the controller pulse width modulates the on state of the switches of at least one of the first and second phases as a function of the error signal to vary a magnitude of the output voltage of the third phase.

7. A power generating system in accordance with claim 5 wherein:
the controller pulse width modulates the on state of the switches of at least one of the first and second phases as a function of the error signal to vary a phase of the output voltage of at least one of the first and second phases to vary the output voltage of the third phase.

8. A power generating system in accordance with claim 2 wherein each inverter further comprises:
a filter coupled to a switching circuit of the inverter and a terminal of the primary winding.

9. An inverter in accordance with claim 8 wherein each phase inverter further comprises:
a pair of switches, coupled to DC potentials of a DC power source and one of the terminals of the primary winding, which are switched between on and off states to produce the AC output voltage in response to control signals applied from a controller.

10. A power generating system in accordance with claim 9 wherein:
the controller averages the AC output voltage of each of the three phases, compares the average to a per phase reference voltage which is proportional to a desired regulated output voltage to produce an error signal, and controls switching of the switches as a function of the error signal to cause the phases to produce the regulated output voltage.

11. A power generating system in accordance with claim 10 wherein:
the controller pulse width modulates the on state of the switches of at least one of the first and second phases as a function of the error signal to vary a magnitude of the output voltage of the third phase.

12. A power generating system in accordance with claim 10 wherein:
the controller pulse width modulates the on state of the switches of at least one of the first and second phases as a function of the error signal to vary a phase of the output voltage of at least one of the first and second phases to vary the output voltage of the third phase.

13. A power generating system in accordance with claim 2 further comprising:
a filter connected to each phase output.

14. A power generating system in accordance with claim 13 wherein each phase inverter further comprises:
a pair of switches, coupled to DC potentials of a power source and one of the terminals of the primary winding, which are switched between on and off states to produce the AC output voltage in response to control signals applied from a controller.

15. A power generating system in accordance with claim 14 wherein each phase inverter further comprises:
the controller averages the AC output voltage of each of the three phases, compares the average to a per phase reference voltage which is proportional to a desired regulated output voltage to produce an error signal, and controls switching of the switches as a function of the error signal to cause the phases to produce the regulated output voltage.

16. A power generating system in accordance with claim 15 wherein each phase inverter further comprises:
the controller controls the timing of on and off states of the switches of at least one of the first and second phases as a function of the error voltage to vary a magnitude of the output voltage of the third phase.

17. A power generating system in accordance with claim 15 wherein each phase inverter further comprises:
the controller controls the timing of on and off states of the switches of at least one of the first and second phases as a function of the error voltage to vary a phase of the output voltage of at least one of the first and second phases to vary the output voltage of the third phase.

18. A method of generating three phase alternating current with each phase being displaced nominally 120° from each other phase from two alternating current voltages displaced nominally 120° apart with each alternating current voltage of the two alternating current voltages being produced by switching a DC potential comprising:

vectorially adding the two alternating current voltages together which are proportional in magnitude to first and second phase outputs to produce a resultant voltage by application of one of the alternatign current voltages to a primary winding and a tap of the primary winding and by application of another of the alternating current voltages to the primary winding of the transformer between another end of the primary winding and the tap; and vectorially inverting the resultant voltage to produce a third phase output which is nominally displaced 120° from the first and second phases by magnetic flux coupling of the primary winding to a secondary winding of the transformer to produce the third phase output from the secondary winding.

19. A method in accordance with claim 18 wherein: the two alternating current voltages are equal in magnitude.

20. A method in accordance with claim 19 wherein: the two alternating current voltages are filtered prior to adding.

21. A method in accordance with claim 19 wherein: the vectorial adding and vectorial inverting is performed by a transformer.

22. A method in accordance with claim 21 wherein: the two alternating current voltages are filtered prior to adding.

23. A method in accordance with claim 21 wherein: the phase outputs are filtered after vectorial adding and vectorial inverting.

24. A method in accordance with claim 19 wherein: the phase outputs are filtered after vectorial adding and vectorial inverting.

25. A method in accordance with claim 18 wherein: the two alternating current voltages are filtered prior to adding.

26. A method in accordance with claim 18 wherein: the phase outputs are filtered after vectorial adding and vectorial inverting.

27. A method in accordance with claim 18 wherein: the vectorial adding and vectorial inverting is performed by a transformer.

28. A method in accordance with claim 27 wherein: the phase outputs are filtered after vectorial adding and vectorial inverting.

29. A method in accordance with claim 27 wherein: the two alternating current voltages are filtered prior to adding.

* * * * *